United States Patent [19]

Catta

[11] Patent Number: 5,640,215
[45] Date of Patent: Jun. 17, 1997

[54] AUDIOVISUAL ENCLOSURE

[75] Inventor: David Catta, Calgary, Canada

[73] Assignee: Evans Consoles, Inc., Calgary, Canada

[21] Appl. No.: 531,289

[22] Filed: Sep. 20, 1995

[30] Foreign Application Priority Data

Aug. 2, 1995 [CA] Canada ................. 2155263

[51] Int. Cl.⁶ .................. H04N 5/72; H04N 5/64
[52] U.S. Cl. ............. 348/789; 348/838; 348/787; 312/7.2
[58] Field of Search .................. 348/789, 744, 348/787, 836, 839, 825, 827; 312/7.2; H04N 5/72, 5/64

[56] References Cited

U.S. PATENT DOCUMENTS

| | | | |
|---|---|---|---|
| 4,719,513 | 1/1988 | Peterson | 348/789 |
| 4,755,881 | 7/1988 | Bartlett | 348/789 |
| 5,315,395 | 5/1994 | Nakao et al. | 348/789 |

*Primary Examiner*—Glenton B. Burgess
*Attorney, Agent, or Firm*—Notaro & Michalos PC

[57] ABSTRACT

A method and an apparatus for positioning a projector, such as a video projector, in an enclosure, comprising a projector support surface, alignment rollers provided in connection with the support surface, and guides adapted to cooperate with the alignment rollers to guide the support surface, and a projector supported thereon, into a predetermined operative position within the enclosure.

23 Claims, 6 Drawing Sheets

AUDIOVISUAL ENCLOSURE

FIELD OF THE INVENTION

This invention relates to an audiovisual enclosure system and more particularly to an enclosure and assembly in which an audiovisual projector is easily positioned and removed from the enclosure.

BACKGROUND OF THE INVENTION

Audiovisual (A/V) systems used in amphitheaters or large conference rooms may be separate systems which can be assembled and disassembled for movement between one location and another. Typically these types of audiovisual systems include a large rear projection screen for viewing and an enclosure unit supporting the screen and for placing the projector in proper alignment for projection of the video images onto a mirror which then directs the images onto the screen.

The projectors used in such systems are typically large, heavy and cumbersome and require serious manhandling to manoeuvre them into the precise position needed to obtain proper projection of the video images onto the screen. They range in weight from 200 to 450 pounds and are mounted within the enclosure on a shelf or other type of immobile support. As a result, regular maintenance is time consuming and difficult as is the reinsertion process. There is a need therefore for a portable audiovisual system in which the projector can be easily loaded and inserted, ideally by a single person, and which also allows precise registration of the projector relative to the enclosure configuration regardless of maintenance or removal/insertion cycles.

SUMMARY OF THE INVENTION

The present invention overcomes the disadvantages of prior assemblies and provides a means for placing, positioning and moving the projector with ease and a minimum of effort.

It is a general object of the present invention to provide an assembly and guide means in which the projector can be easily removed and replaced during regular maintenance/insertion cycles or for other purposes.

It is also a general object of the present invention to provide an audiovisual enclosure system in which the projector can be easily positioned within the enclosure.

It is a further object of a preferred embodiment of the present invention that the upper monitor enclosure portion is pivotally adjustable, and that the position of the projector is automatically adjusted accordingly.

According to the present invention then, there is provided apparatus for positioning a projector in an enclosure, comprising projector supporting means, alignment means provided in connection with the supporting means, and guide means adapted to cooperate with the alignment means to guide the supporting means, and a projector supported thereon, into a predetermined operative position within the enclosure.

According to another aspect of the present invention, there is also provided a method for positioning a projector within an enclosure, comprising the steps of providing a projector support surface in movable relationship to the enclosure, the support surface including alignment means thereon, providing guide means in fixed relation to the enclosure for engaging the alignment means, and moving the support surface towards the enclosure to engage the alignment means with the guide means whereupon further movement of the support surface into the enclosure results in the support surface being guided into a predetermined operative position within the enclosure.

BRIEF DESCRIPTION OF THE DRAWINGS

Preferred embodiments of the present invention will now be further described in greater detail and will be better understood when read in conjunction with the accompanying drawings, in which.

DETAILED DESCRIPTION

Figure 1:
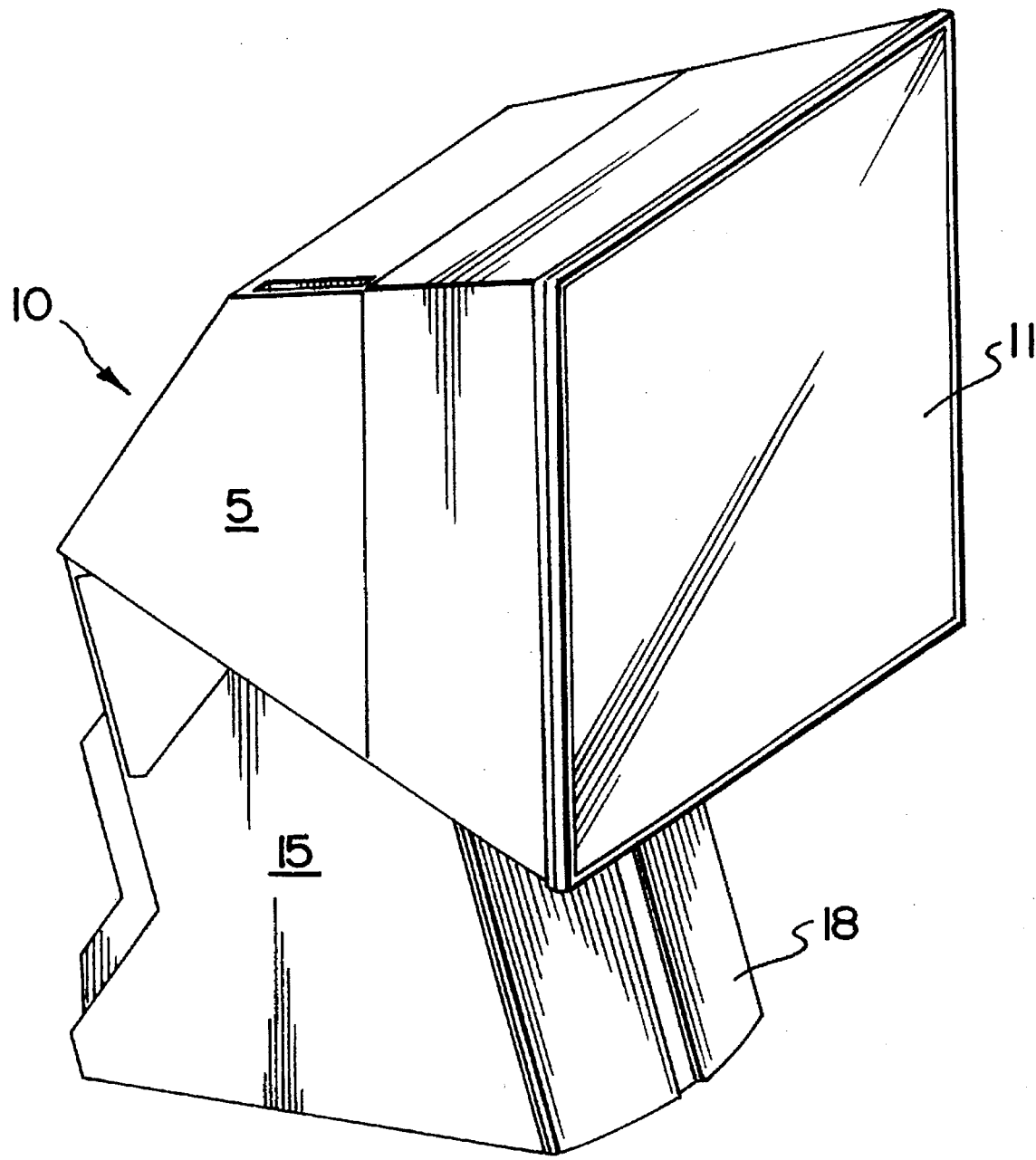
FIG. 1 is a perspective view of the present audiovisual enclosure.

The present system generally comprises an audiovisual (A/V) enclosure 10 which preferably is ventilated, sound absorbing and dust proof, and a wheeled projector cart or dolly 50 (FIG. 2) for tiltably supporting a projector unit 100. The outer shape of enclosure 10 as shown in the drawings hereto is exemplary in nature and is not intended to be limitative of the present invention as claimed herein.

Enclosure 10 is a monocoque assembly whereby the outer panels are structural and form when assembled together a geometrically precise self-supporting structure. The panels are connected together using conventional hardware known to those skilled in the art such as quarter-turn fasteners. The enclosure can therefore be easily dismantled for flat shipment.

Enclosure 10 is generally subdivided into an upper portion 5 which supports a rear projection screen 11 and a mirror 9 to reflect projections from projector 100, and a lower portion 15 which removably encloses projector 100 behind a detachable front panel 18.

Upper portion 5 consists generally of side panels 6, upper panel 7 perforated at 8 for a ventilation stack 13, mirror-supporting rear panel 14, ventilation stack 13 and baseboard 17. Baseboard 17 includes an aperture 22 for the light path from projector 100, another aperture 24 for the ventilation stack and some smaller apertures 26 for fasteners 29 connecting the baseboard to lower portion 15.

Lower portion 15 includes side panels 33, rear panel 34, cowling 36 and detachable front cover 18. The various panels forming lower unit 15 include various openings 44 for sound attenuating intake baffles, air vents and ducts (all not shown) for proper cooling and ventilation of projector 100.

Although the general shape and assembly of enclosure 10 has been briefly described, these descriptions are intended to be exemplary only, and should not be regarded as limitative of the present invention. Other cabinet shapes and assembly techniques may be used in connection with the present system as will be within the range of selection of those skilled in the art.

Figure 3:
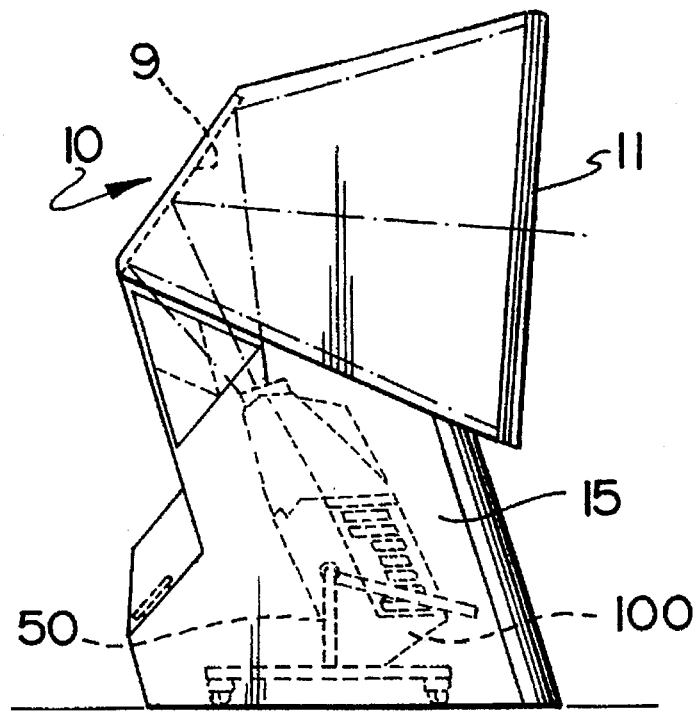
FIG. 3 is a side elevational view of the enclosure of FIG. 1 including a projector positioned therein.
Figure 4:
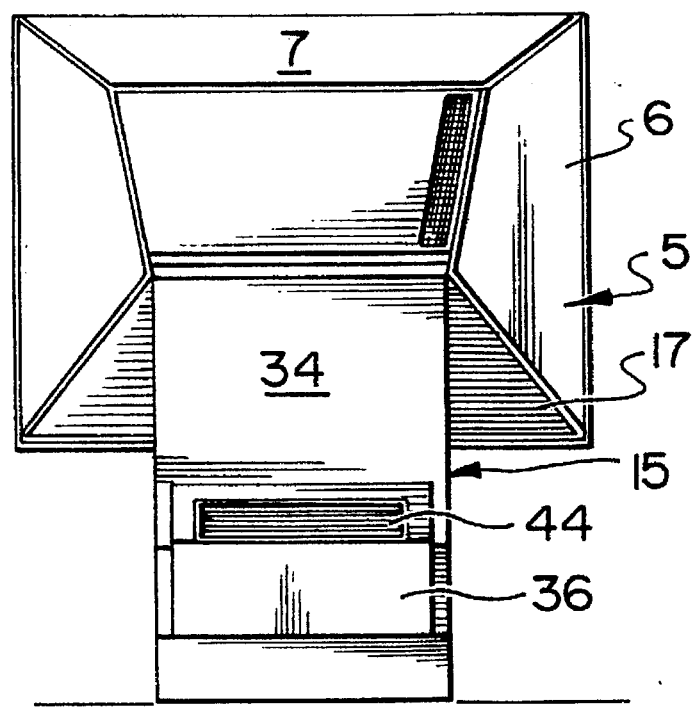
FIG. 4 is a rear elevational view of the enclosure of FIG. 1.

As will be described in greater detail below, projector 100 is positioned within lower portion 15 of enclosure 10 first by placing and then fastening it onto cart 50 and then rolling the cart into the enclosure. The act of rolling the cart into the enclosure positions the projector at the correct preset angle and location, as shown in FIG. 3, for projection onto mirror 9 and screen 11.

Figure 5:
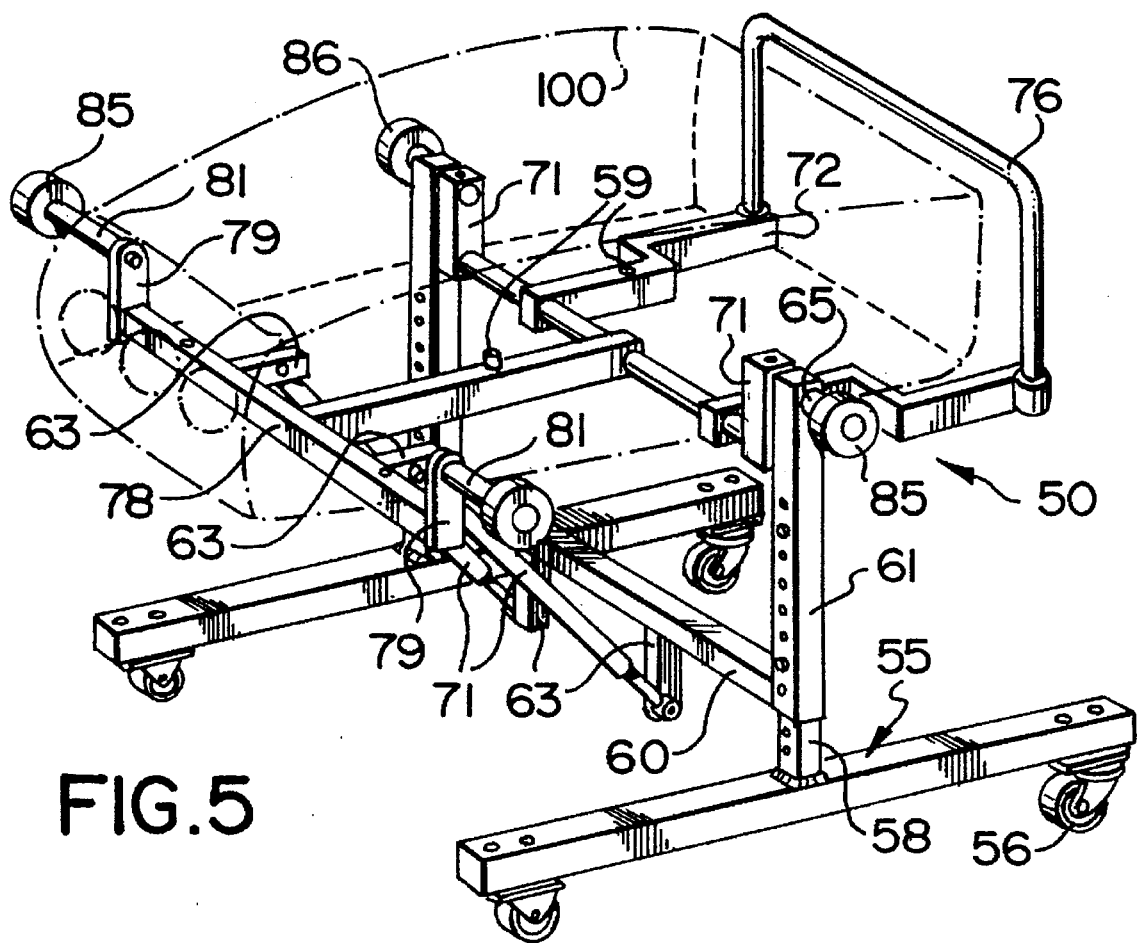
FIG. 5 is a perspective view of a projector cart for supporting a projector for insertion into the enclosure of FIG. 1.
Figure 6:
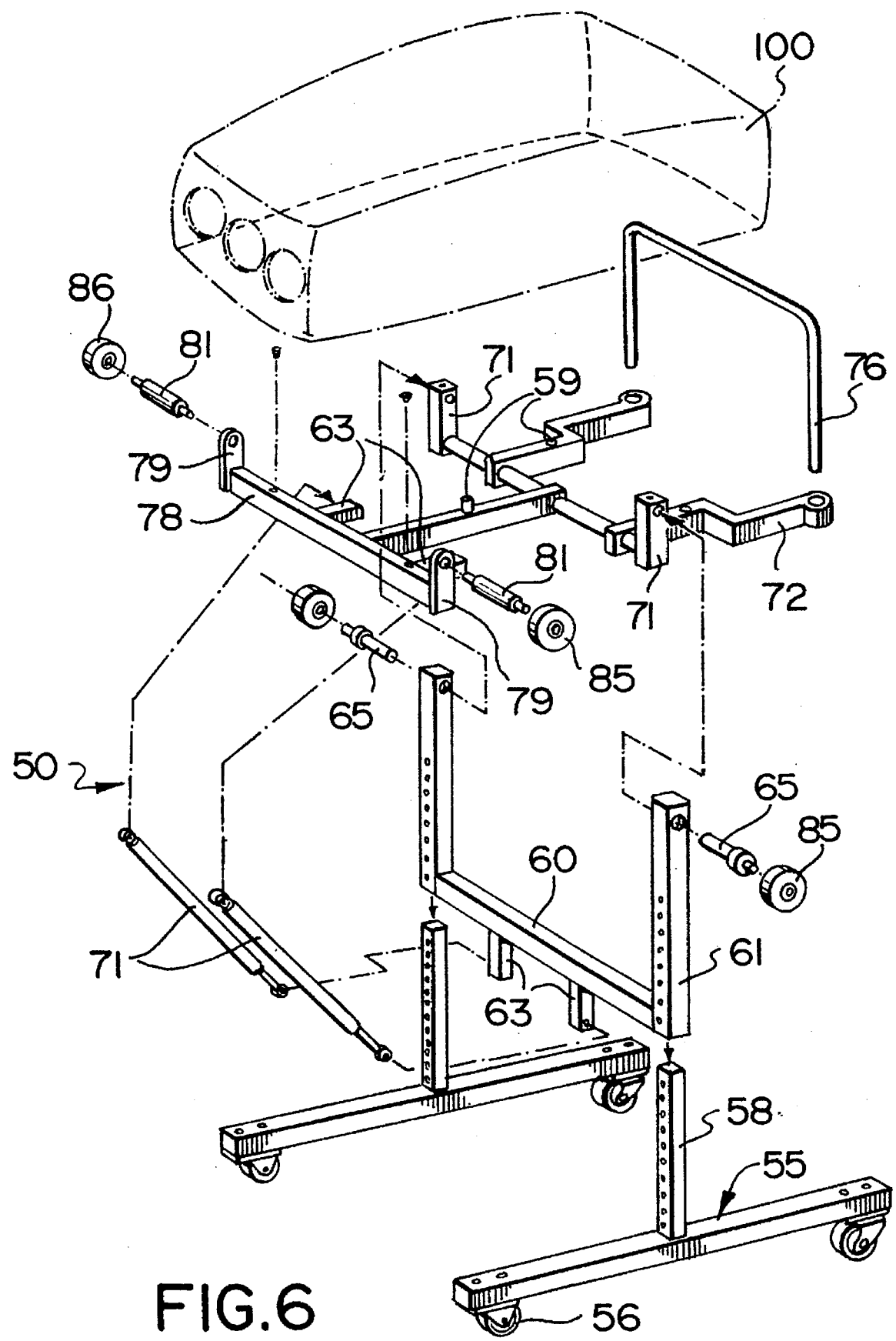
FIG. 6 is an exploded isometric view of the cart of FIG. 5.
Figure 8:
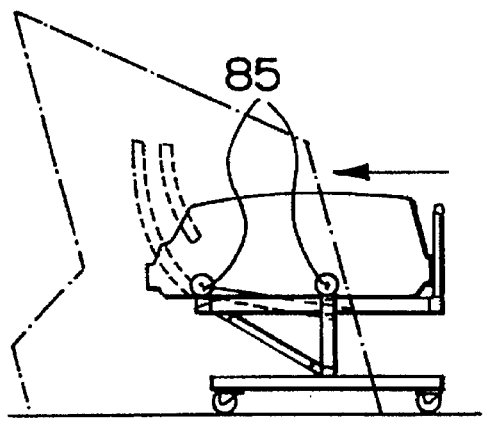
FIGS. 7 to 10 are diagrammatic side elevational views showing the insertion and positioning of the projector within the said enclosure.
Figure 7:
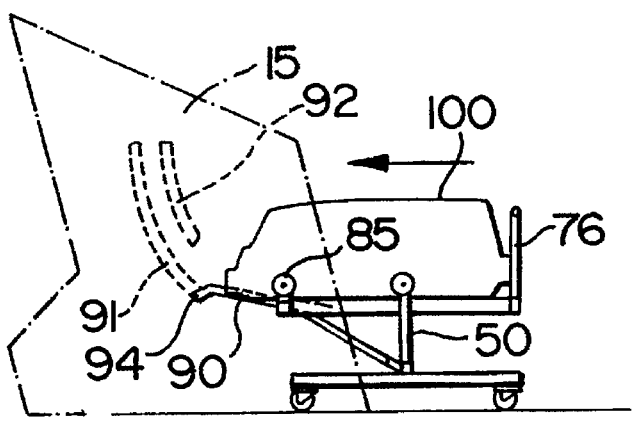
Figure 9:
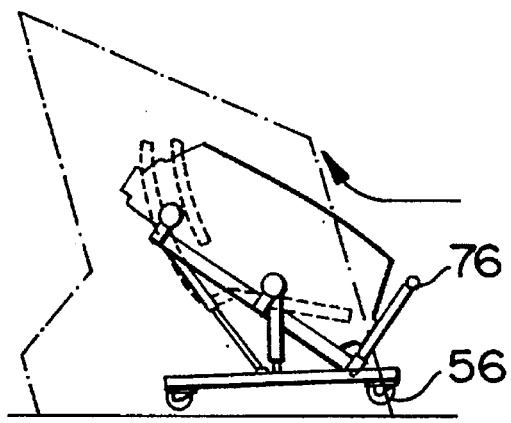
Figure 10:
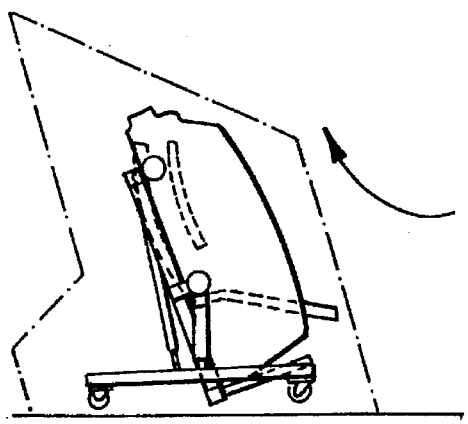

With specific reference to FIGS. 5 and 6, cart 50 provides a wheeled, tiltable platform for supporting projector 100 and allows for mobility of the projector outside and to and from enclosure 10.

The cart includes a lower framework 55 with ground engaging wheels or casters 56, upright supports 58 and a cross member 60 including pillars 61 that lower telescopically onto the uprights for vertical adjustments to the cart's height. A pair of downwardly depending pegs 63 serve as a lower point of attachment for a pair of gas springs 71. The upper ends of pillars 61 including transversely extending apertures which journal pins 65.

A support shelf or tray 72 is pivotally suspended from pillars 61 by means of pins 65 and pivot arms 71. The tray includes pins 59 to align projector 100 to the tray as well as fasteners such as bolts or clamps (not shown) that connect from the underside to securely hold the projector in place. These pins and fastening means are typically specific to projector type. A handle 76 for pushing and pulling the cart is provided at the rear of the tray. A forward cross member 78 supports a pair of uprights 79 and another pair of pegs 63 for connection to the upper ends of gas springs 71.

Pins 65 define the axis about which the projector will pivot but this axis is not necessarily aligned with the projector's center of gravity. The gas springs are therefore a counter-balancing device which offset, at least partially, the projector's weight bias which is towards the tray front.

Uprights 79 support laterally extending pins 81 and the outer ends of pins 81 and 65 each rotatably support a roller 85. The laterally outer surface 86 of each roller can be rounded to facilitate engagement of the rollers with guide means in the enclosure and for centering the cart relative to these guides as will now be described.

After the projector has been loaded onto tray 72, the cart is pushed into the enclosure's lower portion 15 where rollers 85 engage guides such as opposed pairs of tracks 90, 91 and 92 (FIG. 2) fastened to the inner surfaces of side panels 33 of lower portion 15. These tracks can adopt any suitable form including simple 90° runners.

As seen best from FIGS. 2 and 7 to 10, track 90 initially slopes slightly upwardly towards the rear of the enclosure and then dips slightly at an angle below the horizontal. Curved track 91 slopes sharply upwardly towards the top of portion 15 with the intersection of tracks 90 and 91 defining an indentation or cavity 94. Track 91 may be straight but the use of a curvature facilitates insertion.

As the cart is pushed into the enclosure, forward rollers 85 are picked up by tracks 90 to precisely center the projector within the enclosure. As insertion of the cart continues, forward rollers 85 engage tracks 91 and 92 (FIG. 9) to initiate rapid tilting while at the same time trailing rollers 85 engage track 90. When fully inserted, trailing rollers 85 come to rest in cavity 94 and the projector will be correctly and precisely positioned within the enclosure for projection of images onto mirror 9 and screen 11. Moreover, as tracks 90 are angled slightly upwardly, casters 56 and the entire cart assembly will be elevated above floor level so that the full weight of the cart and projector is transferred to the tracks and the enclosure's side walls. This ensures registration of the projector relative to the enclosure regardless of irregularities in the underlying floor. The lower edges of the enclosure can include separate and conventional levelling devices (not shown) to provide a plumb and level position.

To remove the projector, a tug on handle 76 will reverse the procedure for a quick and easy withdrawal. As will be appreciated, the projector can be removed and inserted as often as necessary or desired quickly and easily with precise registration with each insertion.

In one embodiment constructed by the applicant, enclosure 10 is approximately 10 feet in height for a 120 inch diagonal screen size. Enclosures for screen sizes ranging from 84 inches to 180 inches based on the above-described principles are readily provided.

If preferred, upper portion 5 can be made pivotable relative to lower portion 15 so that screen position can be adjusted relative to the audience. The structural panels making up enclosure 10 can be a honeycomb composite to reduce weight and increase strength.

Figure 2:
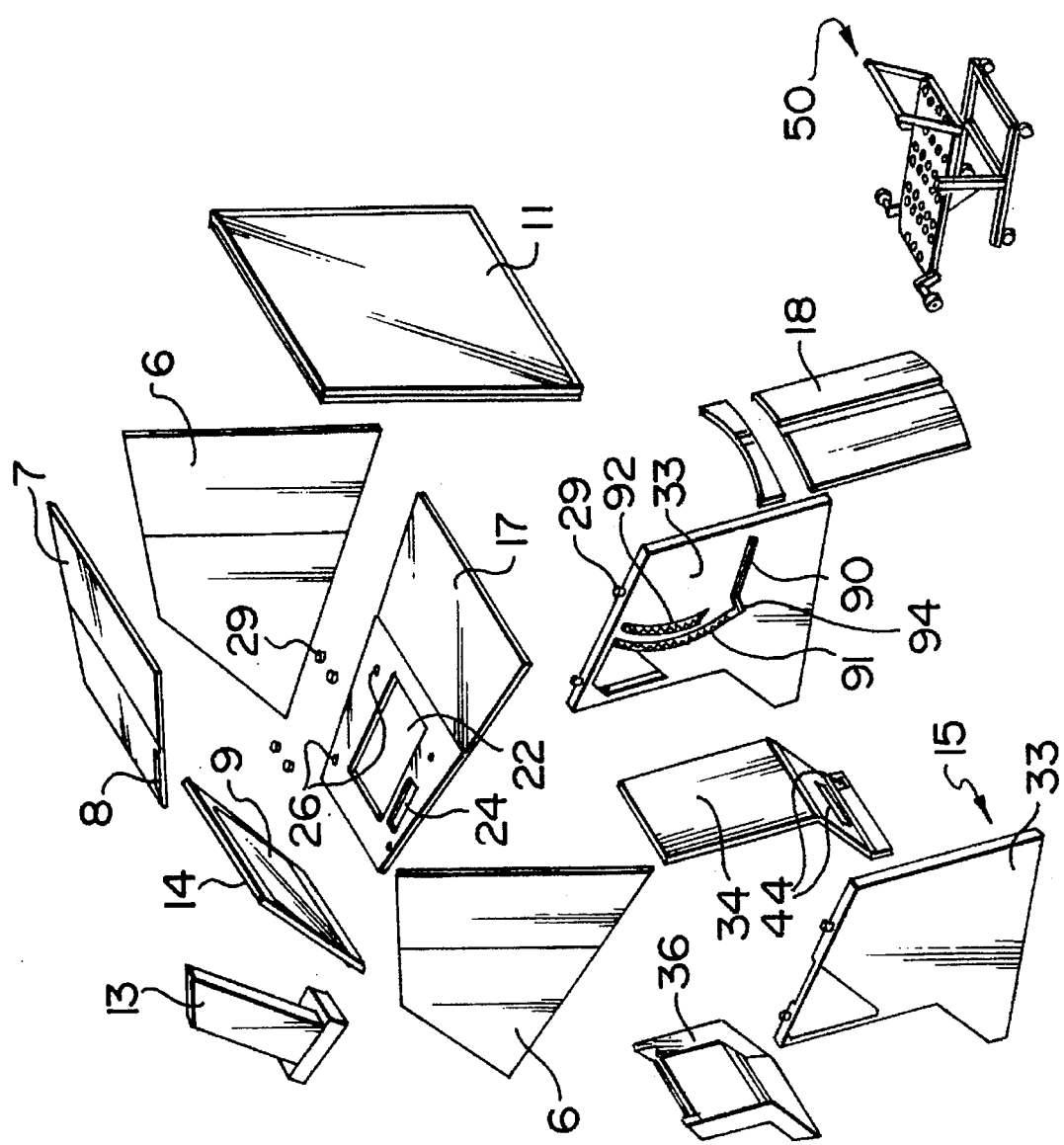
FIG. 2 is an exploded isometric view of the enclosure of FIG. 1.

The structure of cart 50 as described herein is intended to be exemplary only, and alternative constructions, such as shown in FIG. 2, will be apparent to those skilled in the art.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

I claim:

1. Apparatus for positioning a projector in an enclosure having a compartment for said projector, comprising:

support means for supporting the projector for movement into and out from said compartment, said projector being pivotable on said support means about a horizontal axis;

guide means provided in said compartment;

alignment means associated with said support means, said alignment means being adapted to engage said guide means to guide said support means, and a projector supported thereon, into said compartment and for guiding the pivoting of said projector about said horizontal axis into an upwardly tilted operative position thereof.

2. The apparatus of claim 1 wherein said guide means and said alignment means additionally cooperate to removably hold said support means in a predetermined fixed position relative to said compartment.

3. The apparatus of claim 2 wherein said engagement of said guide means and said alignment means results in the elevation of said support means above the ground when said support means are in said fixed position thereof.

4. The apparatus of claim 3 wherein said guide means comprise track means supported by respective opposite sides of said compartment.

5. The apparatus of claim 4 wherein said alignment means comprise roller means positioned on said support means for engaging said track means for movement therealong until said support means attain said fixed position and said projector is tilted into said operative position thereof.

6. The apparatus of claim 5 wherein said track means comprise a first pair of spaced apart tracks for initial contact with said roller means and which are sloped upwardly at a shallow angle to the horizontal, and a second pair of spaced apart tracks inclined at a steeper angle to the horizontal to guide the tilting of said projector into its said operative position.

7. The apparatus of claim 6 wherein at least a portion of each of said first pair of tracks adjacent a respective one of said second pair of tracks slopes downwardly at an angle at least slightly below the horizontal to define, in cooperation with said respective second track, a depression to receive said roller means thereinto to hold said support means in said fixed position thereof without additional fastening means.

8. The apparatus of claim 7 wherein said roller means comprise a first spaced-apart pair of rollers mounted forwardly on said support means, and a second pair of spaced-apart rollers mounted on said support means rearwardly of said first pair, the movement of said first pair of rollers along said second tracks guiding the tilting of said projector into its said operative position as said second pair of rollers travel along said first tracks to elevate said support means above the ground.

9. The apparatus of claim 8 wherein said second pair of rollers, which are connected to said support means for rotation about said horizontal axis, are received into said depressions.

10. The apparatus of claim 9 additionally including resilient means provided on said support means to at least partially counterbalance the weight of said projector disposed forwardly of said horizontal axis to facilitate tilting of said projector into said operative position thereof.

11. The apparatus of claim 10 wherein said support means include a handle member for moving said support means into and out from said compartment and for manually assisting tilting of said projector about said horizontal axis.

12. The apparatus of claim 9 wherein said support means is a movable cart, said cart comprising a frame, ground engaging wheels on said frame, a support surface on said frame for said projector, said support surface being pivotable relative to said frame about a horizontal axis between a first normally horizontal position and a second tilted position, resilient means extending between said support surface and said frame to urge said support surface into said tilted position thereof, and handle means on said support surface to facilitate movement of said cart over the ground and tilting of said support surface about said horizontal axis.

13. The apparatus of claim 12 wherein said frame is adjustable to vary the height of said support surface above the ground.

14. Apparatus for positioning a video projector within a video enclosure having a screen and a space beneath the screen for the projector and in which the projector is removably arranged in a fixed position for projection of images onto said screen, comprising:

movable cart means for supporting the projector for movement into and out from said space, said projector being pivotable about a horizontal axis on said cart means between a first substantially horizontal service position and a tilted projection position; and guide means respectively provided on said cart means and said enclosure adapted for mutual engagement as said cart means are moved into said enclosure for guiding said cart means, and a projector thereon, into said fixed position and to guide the tilting of said projector into said projection position thereof, said guide means further cooperating to removably hold said cart means in said fixed position suspended above the ground.

15. The apparatus of claim 14 wherein said guide means comprise track means on said enclosure and roller means on said cart means that engage said track means for rolling movement therealong until said cart means attain said fixed position and said projector is in said projection position thereof.

16. The apparatus of claim 15 wherein said track means comprise a first pair of spaced apart tracks for initial contact with said roller means and which are sloped upwardly at a shallow angle to the horizontal, and a second pair of spaced apart tracks inclined at a steeper angle to the horizontal to guide the tilting of said projector into its said operative position.

17. The apparatus of claim 16 wherein at least a portion of each of said first pair of tracks adjacent a respective one of said second pair of tracks slopes downwardly at an angle at least slightly below the horizontal to define, in cooperation with said respective second track, a depression to receive said roller means thereinto to hold said cart means in said fixed position thereof without additional fastening means.

18. The apparatus of claim 17 wherein said roller means comprise a first spaced-apart pair of rollers mounted forwardly on said cart means, and a second pair of spaced-apart rollers mounted on said cart means rearwardly of said first pair, the movement of said first pair of rollers along said second tracks guiding the tilting of said projector into its said operative position as said second pair of rollers travel along said first tracks to elevate said cart means above the ground.

19. The apparatus of claim 18 wherein said second pair of rollers, which are connected to said cart means for rotation about said horizontal axis, are received into said depressions.

20. The apparatus of claim 19 wherein said cart means comprise a frame, ground engaging wheels on said frame, a support surface on said frame for said projector, said support surface being pivotable relative to said frame about a horizontal axis between said first normally horizontal position and said second tilted position, resilient means extending between said support surface and said frame to urge said support surface into said tilted position thereof, and handle means on said support surface to facilitate movement of said cart over the ground and tilting of said support surface about said horizontal axis.

21. A method for removably positioning a projector within an enclosure in a predetermined fixed position, comprising the steps of:

providing a projector support means in movable relationship to said enclosure, said support means supporting a projector thereon for pivoting movement about a horizontal axis between a normally horizontal position and a tilted projection position, said support means including alignment means thereon;

providing guide means in fixed relation to said enclosure for engaging said alignment means; and moving said support means towards said enclosure to engage said alignment means with said guide means whereupon further movement of said support means into said enclosure results in said support means being guided into said predetermined fixed position within said enclosure with said projector being tilted into said projection position thereof add with said support means being suspended in said enclosure above the ground.

22. The method of claim 21 wherein said projector is in said normally horizontal position prior to insertion and after removal of said support means from said enclosure.

23. The method of claim 22 wherein said guide means comprise track means on said enclosure and said alignment means comprise roller means on said support means adapted to engage said track means for rolling movement therealong whereby pushing said support means, and a projector thereon, into said enclosure after engaging said roller means with said track means moves said support means into said fixed position thereof and said projector into said tilted projection position thereof.

* * * * *